Nov. 21, 1967  W. FÖLLER  3,353,746
THERMOSTATICALLY CONTROLLED VALVE FOR
A STEAM TRAP OR THE LIKE
Filed July 22, 1965  2 Sheets-Sheet 1

INVENTOR.
Werner Föller
BY
Michael J. Striker

Nov. 21, 1967  W. FÖLLER  3,353,746
THERMOSTATICALLY CONTROLLED VALVE FOR
A STEAM TRAP OR THE LIKE
Filed July 22, 1965  2 Sheets-Sheet 2

INVENTOR.
Werner Föller
BY
Michael J. Striker
Atty

United States Patent Office 3,353,746
Patented Nov. 21, 1967

3,353,746
THERMOSTATICALLY CONTROLLED VALVE FOR A STEAM TRAP OR THE LIKE
Werner Föller, Frankenthal, Pfalz, Germany, assignor to Klein, Schanzlin and Becker Aktiengesellschaft, Frankenthal, Pfalz, Germany
Filed July 22, 1965, Ser. No. 473,938
Claims priority, application Germany, July 24, 1964, K 53,560
10 Claims. (Cl. 236—59)

The present invention relates to a thermostatically controlled valve for a steam trap in which a valve body is moved against the pressure of the fluid into sealing engagement with a valve seat.

Thermostatically controlled valves are known in which the control of the movement of the valve body into sealing engagement with the valve seat is obtained by the action of a column of superimposed elements located in the path of fluid flowing through the valve seat and connected to the valve body. The superimposed elements of such known valves include a plurality of pairs of bimetal members or bimetal plates which curve during increase of the temperature in opposite directions so that the column will expand, as the temperature of the fluid flowing to the valve seat increases, to thus move the valve body in sealing engagement with the valve seat. Valve arrangements of this type are also known in which the column of superimposed elements includes one or more spring elements or spring plates cooperating with the bimetal members to change, when stressed by the expanding bimetal members, the pressure at which the valve body is pressed against the valve seat.

Such thermostatically controlled valves are for instance shown in the copending application Ser. No. 362,748.

It is an object of the present invention to provide a thermostatically controlled valve of the type mentioned above which is constructed in such a manner that the control characteristic of the valve, that is the closing force with which the valve body is pressed against the valve seat, will vary in close approximation to the curve of saturated steam.

It is an additional object of the present invention to provide a valve of the aforementioned kind in which a great variation of the closing force can be obtained with a minimum of spring elements.

Finally, it is also an object of the present invention to provide a valve of the aforementioned kind which is composed of relatively few and simple parts so that the valve may be constructed at very reasonable cost and stand up trouble free under extended use.

With these objects in view, the thermostatically controlled valve according to the present invention mainly comprises a valve seat, a valve body to be moved against the pressure of a fluid flowing to the valve seat, a stationary abutment member upstream of the valve seat, a movable abutment member upstream of the valve seat, spaced from the stationary abutment member and connected to the valve body, and a column of superimposed elements located between the abutment members in the path of fluid flowing to the valve seat, which column engages with opposite ends to the abutment members, respectively. These superimposed elements may include, according to the present invention, a plurality of pairs of bimetal members curving in oposite directions during increase of the temperature of the fluid flowing to the valve seat, a single bimetal member adjacent one of said members of one pair of the bimetal members and curving during increase of the temperature of the fluid in the same direction as said one member of said one pair of members, and a preformed substantially conically shaped spring sandwiched between said single bimetal member and said one bimetal member in such a manner that the spring member will contact with radially inner portions thereof the convexly curving surface of one of the bimetal members adjacent thereto and with radially outer surface portions thereof the concavely curving surface of the other of the bimetal members adjacent thereto. In this arrangement the column of superimposed elements will expand during rise of the temperature of the fluid flowing to the valve seat to move at a predetermined temperature the valve body in engagement with the valve seat and to flex during further rise of the temperature the spring member to an increasing extent to and beyond a flat position so that the radially inner and outer contact portions will move toward each other, whereby the stiffness of the spring member and the pressure at which the valve body is pressed against the valve seat is increased during rise of the temperature of the fluid and vice versa.

This arrangement will result in a control characteristic of the valve which will closely approximately the curve of saturated steam. An additional advantage of the arrangement is that the column of superimposed elements can be built for the same control movement of the valve body with fewer spring members than in the arrangements known in the prior art.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
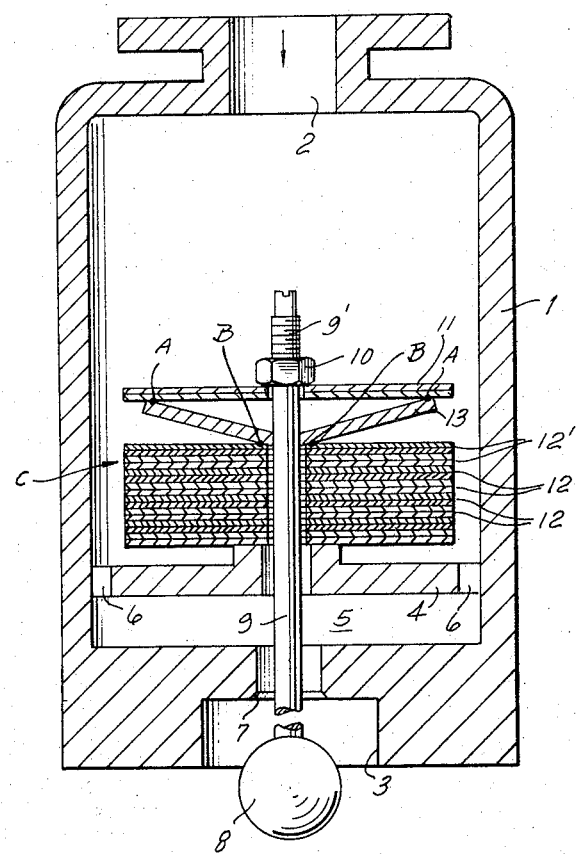
FIG. 1 is an axial cross section through a thermostatically controlled valve according to the present invention and showing the valve in open position.
Figure 2:
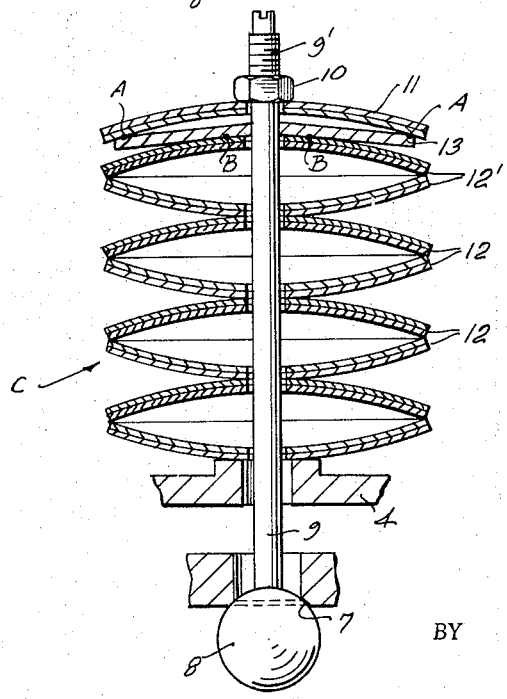
FIG. 2 is a partial cross sectional view similar to FIG. 1 and showing the valve in closed position.

Referring now to the drawings, and more specifically to FIGS. 1 and 2 of the same, it will be seen that the thermostatically controlled valve of the present invention mainly comprises a housing 1 having at its upper end, as shown in FIG. 1, an inlet passage 2 through which steam and/or condensate may enter into the interior of the housing to pass from there through the channels 6 into the chamber 5 and leave the housing through the outlet passage 3 at the lower end thereof. A valve seat 7 is provided in a transverse wall portion between the chamber 5 and the outlet passage 3 and a valve body 8 is arranged coaxial with the valve seat 7 for movement toward and away from the latter for opening and closing the valve. A valve stem or rod 9 connected at its lower end to the valve body 8 extends centrally through an opening of an intermediate wall 4 in the housing towards the inlet passage 2 at the upper end thereof. The upper end of the valve stem 9 is preferably provided with an outer screw thread 9′ and a nut 10 is threadingly connected to the outer screw thread 9′ in the region of the upper end of the valve stem 9. The nut 10, which moves with the valve stem 9 and the valve body 8, forms a movable abutment member, whereas the transverse wall 4 of the housing forms a stationary abutment member. A column C of superimposed elements is located between the abutment members 4 and 10 in the path of fluid flowing from the inlet passage 2 through the channels 6 to the valve seat 7. The superimposed elements of the column C include a plurality of pairs of bimetal members 12, preferably in the form of circular bimetal plates, each provided with a central opening through which the valve stem 9 extends, and the bimetal members 12 in each pair curving during increase of the temperature of the fluid flowing to the valve seat 7 in opposite directions, as shown in FIG. 2. The super-imposed elements of the column C include further a single bimetal member 11 adjacent the upper bimetal member of the uppermost pair 12' of the aforementioned pairs of bimetal members. The single bimetal member 11 is constructed to curve during increase of the temperature of the fluid flowing to the valve seat 7 in the same direction as the upper one of the pair 12' of bimetal members. A preformed substantially conically shaped spring member 13 is sandwiched between the single bimetal member 11 and the upper one of the pair 12' of bimetal members. As can be seen from FIG. 1, the conically shaped spring member 13 is arranged in the untensioned position thereof, that is when the valve is open, in such a manner that the concave surface of the spring member 13 faces the bottom surface of the single spring member 11 and contacts the latter along a circular contact line indicated by the letters A, A at the large diameter end of the conical spring member 13, whereas the convexly curved surface thereof engages the upper surface of the upper one of the pair 12' of bimetal members along a circular contact line indicated by the letters B, B.

The bimetal members in the pair of bimetal members 12 and 12' will curve during rise of the temperature of the fluid flowing through the housing 1 from the flat position as shown in FIG. 1 in opposite directions, as indicated in FIG. 2, and at the same time the single bimetal members 11 will also curve as indicated in FIG. 2. Thereby the nut 10 will be moved in upward direction and the valve body 8 connected to the nut 10 by the valve stem 9 will likewise move in upward direction until the valve body 8 engages the valve seat 7. During further increase of the temperature and further curving of the bimetal members the spring 13 will be increasingly stressed so that the same will be bent from the conical configuration, as shown in FIG. 1, to a substantially flat configuration and subsequently thereto, during further curving of the bimetal members, the spring 13 will be bent in the opposite direction as indicated in FIG. 2. During this part of the bending of the spring the contact lines A and B will move toward each other and the acting portions of the spring will be successively reduced while the stiffness of the spring will be correspondingly increased so as to result during the last part of bending of the spring 13 in a rapid increase of the force with which the valve body 8 is pressed against the valve seat.

Figure 3:
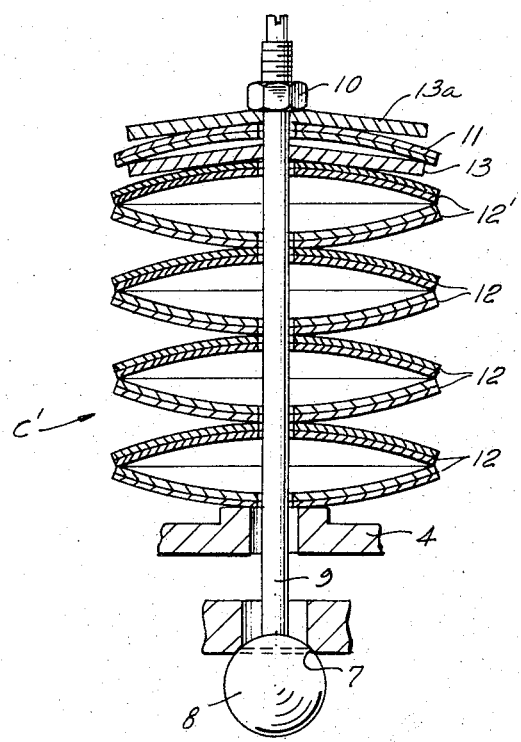
FIG. 3 is a cross sectional view similar to FIG. 2 and showing a modification of the valve.

FIG. 3 shows a modification of the valve illustrated in FIGS. 1 and 2. The arrangement illustrated in FIG. 3 differs from the above described arrangement, in that the modified arrangement includes a second conically arranged spring 13a arranged between the top surface of the single bimetal member 11 and the nut 10. The spring 13 of the arrangement shown in FIG. 3 will act in the same manner as described above and the spring 13a will support the action of the spring 13. Obviously, the arrangement may also include an additional single bimetal member sandwiched between the upper surface of the spring 13a and the nut 10.

Figure 4:
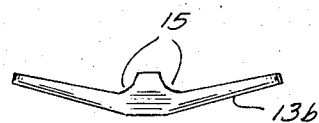
FIG. 4 is a side view of a modified spring member usable in the arrangements shown in FIGS. 1–3.
Figure 5:
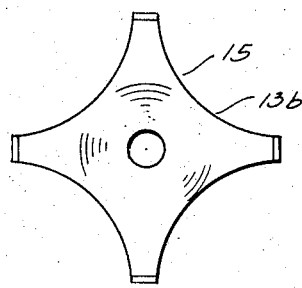
FIG. 5 is a top view of the spring shown in FIG. 4.

In the arrangement of the column C or C' the bimetal member 11 and the spring 13 have to be constructed in such a manner that the force developed by the bimetal members during curving of the same will be great enough to flex the spring 13 in the aforementioned manner. In order to provide for a softer spring, the spring may be constructed as shown in FIGS. 4 and 5 in which the substantially conical spring 13b is formed with a plurality of cutouts 15 which respectively decrease in width from the outer towards the inner periphery of the spring.

The arrangement of the upper abutment member 10 in form of a nut threadingly engaging the upper threaded end 9' of the valve stem 9, permits to adjust the position of the valve body 8 relative to the valve seat 7, in the fully open position of the valve as shown in FIG. 1 in which the bimetal members are substantially flat, by turning the nut 10 on the threaded portion of the valve stem in one or the other direction to adjust thereby the valve to close at different temperatures.

Figure 6:
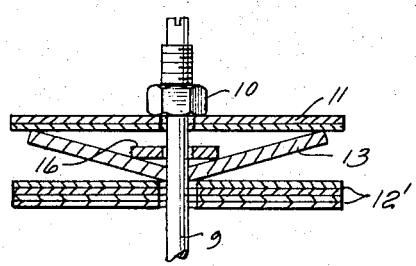
FIG. 6 is a partial cross sectional view similar to FIG. 1 and showing a modified arrangement.

FIG. 6 shows a modified valve arrangement according to the present invention. The modification shown in FIG. 6 differs from the embodiment shown in FIG. 1 in that the modified arrangement includes a substantially rigid space member 16 preferably in form of an annular plate coaxially arranged about the valve stem 9 in the space defined by the inner surface of the conical spring member 13 and the bottom face of the bimetal member 11. In the open position of the valve in which the bimetal member 11 is flat and the spring member 13 unstressed, the upper face of the space member 16 is spaced from the bottom face of the bimetal member 11, as shown in FIG. 6, whereas after curving of the bimetal members and flexing of the spring 13, in the manner as described above, the spacer member 16 will contact the bottom face of the bimetal member 11 to change thereby the manner in which the spring 13 will be flexed during further curving of the bimetal members.

It will be understood that each of the elements described above, or two or more together, may also find a useful application in other types of thermostatically controlled valves for steam traps differing from the types described above.

While the invention has been illustrated and described as embodied in a thermostatically controlled valve for a steam trap having a control column for opening and closing the valve composed of superimposed bimetal members and a substantially conical spring member arranged between two bimetal members which, during increase of the temperature of the fluid flowing through the valve housing, curve in the same direction, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a thermostatically controlled valve for a steam trap having a valve seat and a valve body to be moved against the pressure of a fluid flowing to the valve seat, in combination, a stationary abutment member upstream of said valve seat; a movable abutment member upstream of said valve seat, spaced from said stationary abutment member and connected to said valve body; and a column of superimposed elements located between said abutment members in the path of fluid flowing to said valve seat, said column engaging with opposite ends said abutment members, respectively, and said superimposed elements comprising a plurality of pairs of bimetal members curving in opposite direction during increase of the temperature of the fluid flowing to said valve seat, a single bimetal member adjacent one of the members of one pair of said bimetal members and curving during increase of the temperature of the fluid in the same direction as said one member of said one pair of members, and a preformed substantially conically shaped spring member sandwiched between said single bimetal member and said one bimetal member in such a manner that said spring member will contact with radially inner portions thereof the convexly curving surface of one of said bimetal members adjacent thereto and with radially outer surface portions thereof the concavely curving surface of the other of said bimetal members adjacent thereto, said column expanding during rise of the temperature of the fluid flowing to said valve seat to move at a predetermined temperature said valve body in engagement with said valve seat and to flex during further rise of the temperature said spring member to an increasing extent to and beyond a flat position so that said radially outer and said radially inner contact portions will move toward each other, whereby the stiffness of said spring member and the pressure at which said valve body is pressed against said valve seat is increased during rise of the temperature of the fluid and vice versa.

2. In a thermostatically controlled valve for a steam trap having a valve seat and a valve body to be moved against the pressure of a fluid flowing to the valve seat, in combination, a stationary abutment member upstream of said valve seat; a movable abutment member upstream of said valve seat, spaced from said stationary abutment member and connected to said valve body; and a column of superimposed elements located between said abutment members in the path of fluid flowing to said valve seat, said column engaging with opposite ends said abutment members, respectively, and said superimposed elements comprising a plurality of pairs of bimetal members curving in opposite directions during increase of the temperature of the fluid flowing to said valve seat and in such a manner that the faces of each pair of bimetal members facing each other are concavely curved and the faces thereof facing away from each other are convexly curved, a single bimetal member adjacent one of the members of one pair of said bimetal members and curving during increase of the temperature of the fluid in the same direction as said one member of said one pair of members so that the concavely curving face thereof faces the convexly curving face of said one member of said one pair of members, and a preformed substantially conically shaped spring member sandwiched between said single bimetal member and said one bimetal member in such a manner that said spring member will contact with radially inner portions thereof the convexly curving surface of said one bimetal member of said one pair of bimetal members and with radially outer surface portions thereof said concavely curving face of said single bimetal member, said column expanding during rise of the temperature of the fluid flowing to said valve seat to move at a predetermined temperature said valve body in engagement with said valve seat and to flex during further rise of the temperature said spring member to an increasing extent to and beyond a flat position so that said radially outer and said radially inner contact portions will move toward each other, whereby the stiffness of said spring member and the pressure at which said valve body is pressed against said valve seat is increased during rise of the temperature of the fluid and vice versa.

3. In a thermostatically controlled valve for a steam trap having a valve seat and a valve body to be moved against the pressure of a fluid flowing to the valve seat, in combination, a stationary abutment member upstream of said valve seat; a movable abutment member upstream of said valve seat, spaced from said stationary abutment member; a rod having opposite ends respectively connected to said valve body and to said movable abutment member; and a column of superimposed elements located between said abutment members in the path of fluid flowing to said valve seat, said column engaging with opposite ends said abutment members, respectively, and said superimposed elements comprising a plurality of pairs of substantially circular bimetal plates curving in opposite directions during increase of the temperature of the fluid flowing to said valve seat and in such a manner that the faces of each pair of bimetal plates facing each other are concavely curved and the faces thereof facing away from each other are convexly curved, a single substantially circular bimetal plate adjacent one of the plates of one pair of said bimetal plates and curving during increase of the temperature of the fluid in the same direction as said one plate of said one pair of plates so that the concavely curving face thereof faces the convexly curving face of said one plate of said one pair of plates, and a preformed substantially conically shaped spring member sandwiched between said single bimetal plate and said one bimetal plate in such a manner that said spring member will contact with radially inner portions thereof the convexly curving surface of said one bimetal plate of said one pair of bimetal plates and with radially outer surface portions thereof said concavely curving face of said single bimetal plate, said plates and said spring member being each formed with a central opening through which said rod extends with clearance, said column expanding during rise of the temperature of the fluid flowing to said valve seat to move at a predetermined temperature said valve body in engagement with said valve seat and to flex during further rise of the temperature said spring member to an increasing extent to and beyond a flat position so that said radially outer and said radially inner contact portions will move toward each other, whereby the stiffness of said spring member and the pressure at which said valve body is pressed against said valve seat is increased during rise of the temperature of the fluid and vice versa.

4. A thermostatically controlled valve as set forth in claim 3, wherein said movable abutment member is connected to one end of said rod adjustable in longitudinal direction of the latter so that the valve may be adjusted to close at different temperatures.

5. A thermostatically controlled valve as set forth in claim 3, wherein that end of said rod to which said movable abutment member is connected is provided with an outer screw thread and wherein said movable abutment member is in form of a nut threaded onto said outer screw thread so that the position of said nut may be adjusted in longitudinal direction of said rod so that the valve may be adjusted to close at different temperatures.

6. A thermostatically controlled valve as set forth in claim 1, wherein said column of superimposed elements includes at least an additional preformed substantially conically shaped spring member spaced from said one spring member in longitudinal direction of said column.

7. A thermostatically controlled valve as set forth in claim 1 and including a substantially rigid spacer member arranged between the inner surface of said conically shaped spring member and the surface of one of said bimetal members adjacent to said spring member and facing said inner surface of the latter, said rigid spacer member being arranged substantially coaxial with said members and being spaced, when the temperature of the fluid is below said predetermined temperature, from one of said surfaces.

8. A thermostatically controlled valve as set forth in claim 1, wherein at least said spring member is formed with a plurality of cutouts extending from the periphery of said spring member into the latter.

9. A thermostatically controlled valve as set forth in claim 8, wherein said cutouts have their greatest width at said periphery and narrowing toward the center of said spring member.

10. In a thermostatically controlled valve for a steam trap having a valve seat and a valve body to be moved against the pressure of a fluid flowing to the valve seat, in combination, a stationary abutment member upstream of said valve seat; a movable abutment member upstream of said valve seat, spaced from said stationary abutment member and connected to said valve body; and a column of superimposed elements located between said abutment members in the path of fluid flowing to said valve seat, said column engaging with opposite ends said abutment members, respectively, and said superimposed elements comprising at least one pair of bimetal members curving in the same direction during increase of the temperature of the fluid flowing to said valve seat, and a preformed substantially conically shaped spring member sandwiched between said pair of bimetal members in such a manner that said spring member will contact with radially inner portions thereof the convexly curving surface of one of said bimetal members adjacent thereto and with radially outer surface portions thereof the concavely curving surface of the other of said bimetal members adjacent thereto, said column expanding during rise of the temperature of the fluid flowing to said valve seat to move at a predetermined temperature said valve body in engagement with said valve seat and to flex during further rise of the temperature said spring member to an increasing extent to and beyond a flat position so that said radially outer and said radially inner contact portions will move toward each other, whereby the stiffness of said spring member and the pressure at which said valve body is pressed against said valve seat is increased during rise of the temperature of the fluid and vice versa.

References Cited

UNITED STATES PATENTS

| | | | |
|---|---|---|---|
| 2,912,166 | 11/1959 | Domnick | 236—59 |
| 3,042,363 | 7/1962 | Deeks | 236—59 X |
| 3,175,766 | 3/1965 | Pape et al. | 236—59 |
| 3,220,650 | 11/1965 | Deeks | 236—59 |

WILLIAM J. WYE, *Primary Examiner.*